(12) United States Patent
Tanaka et al.

(10) Patent No.: US 8,183,857 B2
(45) Date of Patent: May 22, 2012

(54) ROTATION ANGLE DETECTION DEVICE FOR DETECTING ROTATION ANGLE OF A ROTATING BODY

(75) Inventors: Kengo Tanaka, Tokyo (JP); Fumihiko Abe, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 366 days.

(21) Appl. No.: 12/519,512

(22) PCT Filed: Dec. 14, 2007

(86) PCT No.: PCT/JP2007/074104
§ 371 (c)(1),
(2), (4) Date: Jun. 16, 2009

(87) PCT Pub. No.: WO2008/075620
PCT Pub. Date: Jun. 26, 2008

(65) Prior Publication Data
US 2010/0007341 A1    Jan. 14, 2010

(30) Foreign Application Priority Data
Dec. 18, 2006  (JP) ................................. 2006-339417

(51) Int. Cl.
*G01B 7/30* (2006.01)
(52) U.S. Cl. ............................... 324/207.2; 324/207.25
(58) Field of Classification Search .. 324/207.2–207.25, 324/174; 12/207.2–207.25, 174
See application file for complete search history.

(56) References Cited

U.S. PATENT DOCUMENTS 5,164,668 A * 11/1992 Alfors .................... 324/207.2
5,196,794 A *  3/1993 Murata ..................... 324/251
(Continued)

FOREIGN PATENT DOCUMENTS
EP          0798541 A1     10/1997
(Continued)

OTHER PUBLICATIONS

International Search Report dated Jan. 22, 2008 for PCT Application Serial No. PCT/JP2007/074104, 3 Pages.

(Continued)

*Primary Examiner* — Jay Patidar
(74) *Attorney, Agent, or Firm* — Turocy & Watson, LLP

(57) ABSTRACT

A rotation angle detection device for detecting rotation angle of a rotating body to be measured includes magnetic detection elements which are fixed to a stator and detect magnetic flux density of a magnet which is rotated with the rotating body. The device can calculate rotation angle of the rotating body from outputs of the magnetic detection elements. The device also includes magnetic bodies having two edge portions in positions where the magnet is inserted and arranged along an area where a magnetic line of force of the magnet is formed. Gaps can be provided between one edge portion of the magnetic bodies in the direction of the rotation center axis of the magnet and one side of the magnet in the direction of the rotation center axis, and between another edge portion of the magnetic bodies in the direction of the rotation center axis of the magnet and another side of the magnet in the direction of the rotation center axis, and the magnetic detection elements are intermediated in the magnetic line of force which passes through the magnetic bodies.

5 Claims, 8 Drawing Sheets

U.S. PATENT DOCUMENTS

| | | | |
|---|---|---|---|
| 6,163,148 A * | 12/2000 | Takada et al. | 324/226 |
| 7,135,857 B2 * | 11/2006 | Johnson | 324/207.2 |
| 2002/0089324 A1 * | 7/2002 | Miyata et al. | 324/207.2 |
| 2004/0100252 A1 * | 5/2004 | Babin | 324/207.25 |

FOREIGN PATENT DOCUMENTS

| | | |
|---|---|---|
| JP | 61-278713 A | 12/1986 |
| JP | 2003-75108 A | 12/1995 |
| JP | 8-126380 A | 5/1996 |
| JP | 2003-185470 A | 7/2003 |
| JP | 2003-262537 A | 9/2003 |
| JP | 2006105827 | 4/2006 |

OTHER PUBLICATIONS

European Search Report dated Apr. 29, 2011 for EP Application No. 07850608.6, 6 pages.

* cited by examiner

ROTATION ANGLE DETECTION DEVICE FOR DETECTING ROTATION ANGLE OF A ROTATING BODY

CROSS-REFERENCE TO RELATED APPLICATIONS

This application is a U.S. national stage filing of patent cooperation treaty (PCT) Appln. No. PCT/JP2007/074104 (WO 2008/075620), filed Dec. 14, 2007, which claims priority to Japanese patent application No. 2006-339417, filed on Dec. 18, 2006, the entire content of which are incorporated herein by reference.

TECHNICAL FIELD

The present invention relates to a rotation angle detection device which is attached to a rotating body and is used for detecting rotation angle of the rotating body.

BACKGROUND ART

For example, a rotation angle detection device for detecting rotation angle of a rotating shaft is conventionally known (refer to, for example, patent document 1). In this rotation angle detection device, a magnet which is formed in disk shape is supported by a rotating shaft, and is maintained to be rotatable in the prescribed direction with the rotating shaft as the center. And, in this rotation angle detection device, two magnetic sensors are provided. The two magnetic sensors consist of hall elements which are arranged so that the line running through the center of the disk and one magnetic sensor and the line running through the center of the disk and another magnetic sensor substantially meet at an angle of 90°. And respective magnetic sensors are arranged below the circumference of the magnet.

Patent document 1: Japanese Patent Application Publication 2003-75108 (from page 2 to 4, FIGS. 4 and 5)

DISCLOSURE OF INVENTION

Problem to be Solved

In the conventional rotation angle detection device described above, the magnet is magnetized in the diameter direction and the hall elements are arranged on the edge portions of the outer circumference of the magnet to improve sensitivity of the sensors. In this kind of configuration, high accuracy of detection can be retained only when relative positions of the magnet and hall elements are not changed. However, in the actual rotation angle detection device, since there is instability in the rotating shaft in the shaft direction or in the diameter direction, relative distance between the magnet and the hall elements is dynamically varied, there has been a problem that signals which have no relation to the rotation of the rotating shaft caused by the movement of the magnet are detected by the hall elements and the rotation angle cannot be accurately detected.

Specifically, for example, when this kind of rotation angle detection device is fixed to a steering shaft of a vehicle, the rotation angle detection device needs to be quickly fixed to the steering shaft within a remitted short tact time and the instability between the rotor and stator of the rotation angle detection device, especially in the shaft direction, is usually allowed in some degree to improve assembling task like this.

However, when this kind of instability is allowed, variation of relative positions of the rotor and stator of the rotation angle detection device in the shaft direction of the rotor is caused, and, since the relative positions of the both in the shaft direction of the rotor are shifted, the magnetic line of force dose not cross the hall elements in a preferable status and high detection accuracy of the rotation angle detection device cannot be maintained.

The details of this are explained based on the figures. FIG. 10 is schematic plan view of this kind of rotation angle detection device 5 and the hall elements 90 (91 and 92) are respectively arranged in vicinity of the circumference of the magnet 50 at an angle of 90° in the circle direction. FIG. 11 is schematic view of magnetic line of force 50A of the disk shaped magnet 50 in the case that the rotation angle detection device 5 is preferably fixed to the non-depicted steering shaft by the shaft 55. In the same figure, the hall element 90 (hall element 91 in the FIG. 11) is arranged on a substrate 70 which is fixed to be arranged independently from the rotation of the magnet 50 in vicinity of the edge portion of the disk shaped magnet 50 where has the greatest polarity ratio so as to cross the magnetic line of force 50A. And thickness of the magnetic flux density is detected by the hall element 90.

On the other hand, FIG. 12 shows the status that the magnet 50 of the rotation angle detection device 5 shown in FIG. 11 is shifted in relation to the hall element 91 in the direction of rotation center axis of the magnet 50 in some degree by the instability when the instability between the stator and the rotor in the direction of the rotation center axis of the rotor of the rotation angle detection device 5 is allowed in some degree to improve the assembling task of the rotation angle detection device 5 as described above. The shifting amount is the amount which is necessary to improve the assembling task of the rotation angle detection device 5 as described above. When the rotation angle detection device 5 is in this kind of status, it is seen that the magnetic line of force 50 A of the magnet 50 leave the hall elements 90 and the detection properties of the hall elements 90 are extremely diminished.

On the other hand, for example, a rotation angle detection device described in Japanese patent application publication 2006-105827 is also known. This rotation angle detection device includes a ring shaped magnet into which a steering shaft of a vehicle is inserted to improve flexibility of fixing location to the steering of the vehicle. However, even in this kind of rotation angle detection device, since the hall elements are also arranged in vicinity of the edge portion of the disk shaped magnet where has the greatest polarity ratio to improve the detection properties of the sensors themselves, the same problem as the case described above, namely, the problem that, when the instability between the rotor having the magnet and the stator having the hall elements in the direction of the rotation center axis of the rotor, namely, in the direction of the rotation center axis of the magnet is allowed in some degree to improve the assembling task of the rotation angle detection device, the hall elements do not cross the magnetic circuit of the magnet because of variations of the relative positions of the stator and the rotor and detection output properties are diminished.

FIG. 13 is schematic view of the magnetic line of force 60A of the magnet 60 in the case that the rotation angle detection device 6 is fixed to the non-depicted shaft in preferable relative sizes. In the same figure, the hall element 90 is arranged in vicinity of the edge portion of the magnetic line of force 60A of the ring shaped magnet 60 so that the thickness of the magnetic flux density is detected by the hall element 90 fixed to be arranged on the substrate 80 which is fixed to be arranged independently from the rotation of the magnet 60.

On the other hand, FIG. 14 shows the status that, when the instability between the stator and the rotor in the direction of the rotation center axis of the rotor is allowed to improve the assembling task of the rotation angle detection device 6 as described above, the magnet 60 of the rotation angle detection device 6 shown in FIG. 13 is shifted in relation to the hall element 90 in the direction of the rotation center axis of the magnet 60 in some degree by the instability. The shifting amount is the amount which is necessary to improve the assembling task of the rotation angle detection device 6 as described above. In this kind of status, it is seen that the magnetic line of force 60A of the magnet 60 leave the hall element 90 and the detection property of the hall element 90 is extremely diminished.

In relation to the problem described above, even when the relative positions of the magnet and hall elements are shifted in the orthogonal direction to the rotation center axis of the magnet, since the hall elements leave the magnetic line of force of the magnet, the detection property of the hall element 90 is similarly diminished.

The purpose of this invention is to provide a rotation angle detection device capable of accurately detecting rotation angle of a rotating body to be measured even when a rotating shaft of the rotating body to be measured has the instability of the shaft or the like.

Means to Solve the Problem

To solve the problems described above, a rotation angle detection device according to the present invention is the rotation angle detection device for detecting rotation angle of a rotating body to be measured, comprising magnetic force detection elements for being fixed to circumference of the rotating body to be measured to detect magnetic flux density of a magnet integrally rotating with the rotating body to be measured, calculation process means for calculating the rotation angle of the rotating body to be measured from outputs of the magnetic detection elements, and, further comprising magnetic bodies including both edge portions in the positions where the magnet is inserted and arranged along the area where the magnetic line of force of the magnet is formed, wherein there are gaps between one edge portions of the magnetic bodies and one side of the magnet in the direction of the rotation center axis and between another edge portions of the magnetic bodies and another side of the magnet in the direction of the rotation center axis, the magnetic detection elements are intermediated in the magnetic line of force passing through the magnetic bodies.

Since the rotation angle detection device has this kind of configuration, even when the relative positions of the rotor having the magnet and the stator having the magnetic bodies and magnetic detection elements are shifted in the direction of the rotation center axis of the magnet, sum of the gaps between one edge portions of the magnetic bodies and one side of the magnet in the direction of the rotation center axis and between another edge portions of the magnetic bodies and another side of the magnet in the direction of the rotation center axis is maintained to be constant all the time. Accordingly, the magnetic resistance of the magnetic path cannot be varied. As a result, the magnetic detection elements are not affected by the variation of the relative positions of the stator and the rotor all the time and the magnetic flux density of the magnet can be accurately detected by the magnetic bodies corresponding to the rotation angle of the magnet, namely, the rotating body to be measured.

Furthermore, since the magnetic path is formed by the magnetic bodies and the magnetic line of force can be confined in the magnetic bodies, the extremely small sized magnet in the direction of the rotation center axis can be used and the rotation angle detection device, itself, can be downsized.

Furthermore, in addition to the rotation angle detection device described above, the rotation angle detection device according to the present invention is characterized in that protruding portions extended along the rotating direction of the magnet are respectively provided on one edge portions of the magnetic bodies opposing to one side of the magnet in the direction of the rotation center axis and on another edge portions of the magnetic bodies opposing to another side of the magnet in the direction of the rotation center axis.

Since the magnet of the rotation angle detection device according to the present invention has this kind of configuration, even when the relative positions of the rotor having the magnet and the stator having the magnetic bodies and magnetic detection elements are shifted in the direction orthogonal to the direction of the rotation center axis of the magnet, the magnetic line of force of the magnet is stably formed along the magnetic bodies all the time by the protruding portions provided on the both edge portions of the magnetic bodies, and, even when the rotor and the stator are shifted in the direction of the rotation center axis of the rotor by the instability between the rotor and the stator, the magnetic resistance cannot be affected by the shifting amount of the rotor and the stator. As a result, the detection elements are not affected by the shifting of the relative positions of the rotor and the stator, and the magnetic flux density of the magnet can be accurately measured corresponding to the rotation angle of the magnet, namely, the rotating body to be measured all the time.

Furthermore, in addition to the rotation angle detection device described above, the rotation angle detection device according to the present invention is characterized in that protruding portions protruding toward one side of the magnet are provided on one edge portions of the magnetic bodies opposing to one side of the magnet in the direction of the rotation center axis and protruding portions protruding toward another side of the magnet are provided on another edge portions of the magnetic bodies opposing to another side of the magnet in the direction of the rotation center axis.

Since the magnetic bodies of the rotation angle detection device according to the present invention have this kind of shape, the magnetic bodies, themselves, have similar shape to the magnetic line of force of the magnet, the magnetic flux of the magnet is stably formed in the magnetic bodies, and the magnetic resistance of the magnetic path is not varied by the shifting amount of the rotor and the stator even when the rotor and the stator are shifted in the direction of the rotation center axis of the rotor by the instability between the rotor and the stator. As a result, the detection elements are not affected by the shifting of the relative positions of the rotor and the stator, and the thickness and the direction of the magnetic flux of the magnet can be accurately measured by the magnetic bodies corresponding to the rotation angle of the magnet, namely, the rotating body to be measured all the time.

Furthermore, in addition to the rotation angle detection device described above, the rotation angle detection device according to the present invention is characterized in that the gaps between one edge portions of the magnetic bodies opposing to one side of the magnet in the direction of the rotation center axis and another edge portions of the magnetic bodies opposing to another side of the magnet in the direction of the rotation center axis are shorter than the length of the portions of magnetic bodies substantially parallel to the direction of the rotation center axis of the magnet.

Since the magnetic bodies of the rotation angle detection device has this kind of shape, the magnetic line of force generated by the magnet is gathered to the magnetic bodies, the magnetic flux of the magnet is stably formed in the magnetic bodies, and the magnetic resistance of the magnetic path is not varied by the shifting amount of the rotor and the stator even when the rotor and the stator are shifted in the direction of the rotation center axis of the rotor by the instability between the rotor and the stator. As a result, the detection elements are not affected by the shifting of the relative positions of the rotor having the magnet and the stator having the magnetic detection elements, and the thickness and the direction of the magnetic flux of the magnet can be more accurately measured by the magnetic bodies corresponding to the rotation angle of the magnet, namely, the rotating body to be measured all the time.

Furthermore, in addition to the rotation angle detection device described above, the rotation angle detection device according to the present invention is characterized in that the magnet has ring shape, North Pole and South Pole are formed in the direction parallel to the rotation axis of the magnet, and North Pole and South Pole are formed so that the magnetic flux density is also periodically varied also along the direction of the rotation axis of the magnet.

Since, even when the magnet has ring shape, the rotation angle detection device is able to have the configuration in which the components of the rotation angle detection device need not to be arranged in the hollow portion of the ring shaped magnet, the rotation angle detection device, itself, can be downsized.

DESCRIPTION OF THE PREFERRED EMBODIMENT

The rotation angle detection device 1 according to one embodiment of the present invention is explained below based on the figures. In this explanation, the case that, in the steering device of an automobile, the rotation angle detection device is attached to the steering shaft (simply described as shaft below), namely, the rotating body to be measured, for detecting the rotation angle of a handle is explained. The hatchings are omitted in the sectional views so that the present invention can be easily understood.

Figure 1:
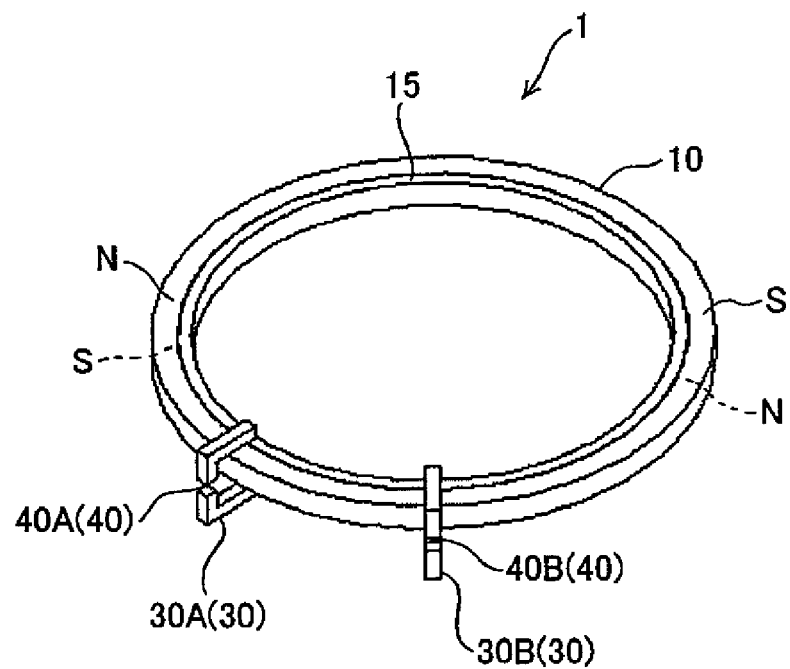
FIG. 1 is schematic perspective view of the rotation angle detection device according to one embodiment of the present invention.
Figure 2:
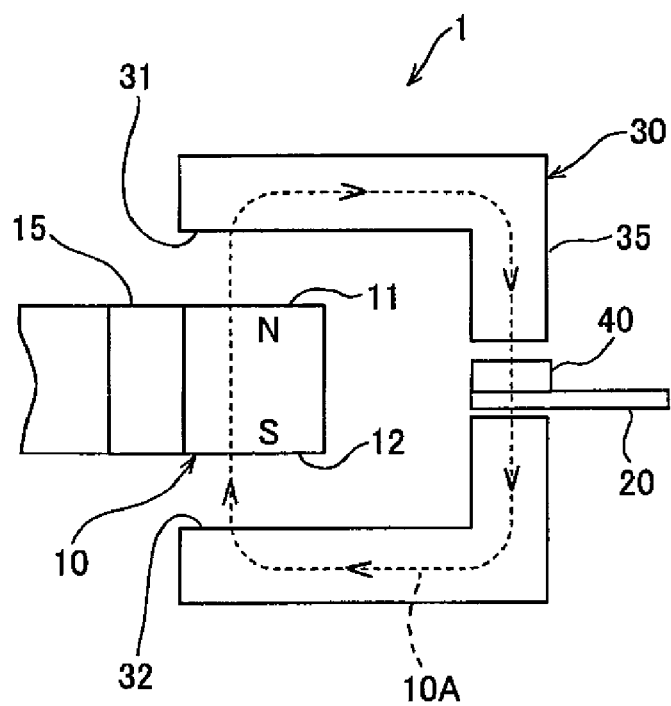
FIG. 2 is cross sectional view of the substrate on which the magnet, the spacer, the magnetic body, and the hall element of one part of the rotation angle detection device shown in FIG. 1 are mounted.

As shown in FIG. 1 and FIG. 2, the rotation angle detection device 1 according to one embodiment of the present invention comprises a ring shaped magnet 10, a substrate 20 (depicted only in FIG. 2) fixed to be supported independently from the rotation of the magnet 10, magnetic bodies 30 (30A and 30B) arranged in the circle direction of the magnet 10 so as to respectively meet at the center axis of the ring shaped magnet 10 at a prescribed angle (for example, at an angle of 90°) in the circle direction, hall elements (magnetic detection elements) 40 (40A and 40B) intermediated between the respective magnetic bodies 30. The substrate 20 and the magnetic bodies 30 (30A and 30B) are fixed to the non-depicted stator consisting of a box or the like.

And ring shaped spacer 15 made from non-magnetic material is provided on the inner side of the magnet 10. And, for example, a non-depicted serration is formed on the inner surface of the ring shaped spacer 15 and, for example, the shaft of an automobile (not depicted) is inserted into the inner surface of the spacer 15 so as to be engaged with the serration of the shaft. And the magnet 10 integrally rotates accompanied by the rotation of the shaft. The magnet 10 is supported so as to be rotatable on the substrate 20 or the box by bearings or the like which do not affect the magnetic circuit.

The magnet 10 has the configuration in which, in one edge portion in the circle direction (for example right side shown in FIG. 1), South Pole is formed on one side of the magnet 10 in the direction of the rotation center axis (upper side shown in FIG. 1) and North Pole is formed on another side of the magnet 10 in the direction of the rotation center axis (lower side shown in FIG. 1), and in another edge portion in the circle direction (the opposite edge portion to one edge portion in the diameter direction, left side shown in FIG. 1), North Pole is formed on one side and South Pole is formed on another side. And the forming areas of North Pole and South Pole are gradually exchanged between one edge portion and another edge portion of the magnet 10 in the direction of the rotation center axis (in the thickness direction of the magnet 10).

The substrate 20 is fixed to the stator consisting of the box or the like which is not depicted. The magnet 10 and the spacer 15 compose a part of the rotor or the entire rotor whose details are not explained.

Although the details are not shown, the magnet 10, spacer 15, substrate 20, magnetic bodies 30 are received in the box which is made from the material insulating magnetic flux from outside and is fixed to fixing position different from the shaft by bracket or the like which is not depicted. Since the configurations of one magnetic body 30A and another magnetic body 30B which compose the magnetic bodies 30 are equivalent, these components are denoted by the same code for explanation.

The magnetic bodies 30 (30A and 30B) are made from soft magnetic material such as iron or plastic magnet and has rectangular U-shape in the horizontal direction from a side view point so that the magnet 10 is inserted between the both edge portions 31 and 32. And, as described above, two hall elements 40 (40A and 40B) are provided on the substrate 20 so that variation of the magnetic flux density caused by the rotation of the magnet 10 which integrally rotates with the non-depicted shaft is detected by the respective hall elements 40.

As explained in detail in FIG. 2, the magnetic body 30 has both edge portions 31 and 32 arranged along the area where the magnetic line of force 10A of the magnet 10 is formed on the positions where the magnet 10 is inserted. And the magnetic body 30 has gaps between one side 11 of the magnet 10 in the direction of the rotation center axis and one edge portion 31 of the magnetic body 30 in some degree and also between another side 12 of the magnet 10 in the direction of the rotation center axis and another edge portion 32 of the magnetic body 30 in some degree. A prescribed gap is formed in some degree in the substantial center of the extending portion 35 which is located in the most remote position from the magnet 10 in the radius direction of the magnet 10 and is substantially parallel to the rotation center axis of the magnet 10, into which the edge portion of the substrate 20 and the hall element 40 mounted on the substrate 20 are inserted. And the output of the hall element 40 is converted into the rotation angle of the magnet 10, namely, the shaft in use of calculation means which is not shown in detail.

Figure 3:
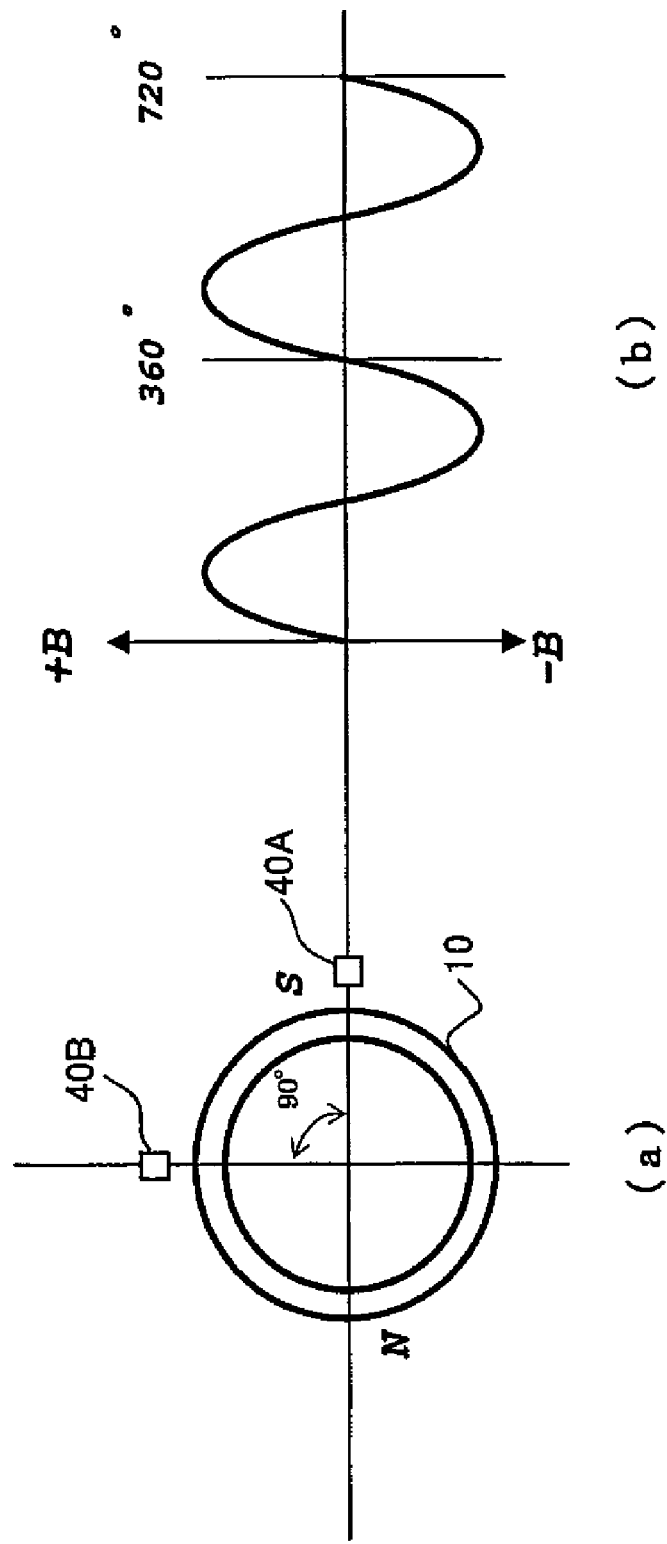
FIG. 3 is explanation figures which partially show rotation angle detection principle of the rotation angle detection device shown in FIG. 1.

The fact that, for example, one hall element 40A shown in the left side of FIG. 3 (a) has output property shown in FIG. 3 (b) is utilized in the detection principle of the rotation angle of the magnet 10, namely, the shaft in use of the hall element 40 and the calculation means described above. In FIG. 3 (b), the rotation angle of the shaft, namely, the magnet 10 is shown by horizontal axis and thickness of the magnetic flux density of the magnet 10 detected by the hall element 40A is shown by vertical axis. As seen from FIG. 3 (b), the output property of one hall element 40A shows sine wave (sinusoidal wave).

Although there is no depiction, another hall element 40B which is arranged above the magnet 10 in FIG. 3 (a) has similarly the output property which shows sinusoidal wave shown in FIG. 3 (b), however, because of the arranging positions of the both hall elements on the substrate, the phase of the output property of the hall element 40B is shifted from the output property of one hall element 40A shown in FIG. 3 (b) by an angle of 90°. And, when the respective outputs of the hall elements 40A and 40B whose phases are shifted by an angle of 90° are denoted by X and Y, output which has a saw blade shape can be obtained from $\tan^{-1}(X/Y)$, and, accordingly, the rotation angle in 360° cycle is accurately detected by the calculation means.

Then, the function of the rotation angle detection device according to the present embodiment is explained. Since the rotation angle detection device 1 according to the present invention has this kind of configuration, even when the relative positions of the rotor having the magnet 10 and the stator having the magnetic bodies 30 and hall elements 40 are shifted, the sum of the gaps between one side 11 of the magnet 10 in the direction of the rotation center axis and one edge portions 31 of the magnetic bodies 30 and the gap between another side 12 of the magnet 10 in the direction of the rotation center axis and another edge portions 32 of the magnetic bodies is always maintained to be constant. Accordingly, the magnetic line of force formed in the magnetic bodies is not varied by the shifting, and, even when the rotor and the stator are shifted in the direction of the rotation center axis of the rotor by the instability between the rotor and the stator, the magnetic resistance of the magnetic path is not varied by the shifting amount of the both. As a result, the hall elements 40 are not affected by the shifting of the relative positions, and the thickness and the direction of the magnetic flux of the magnet 10 can be accurately measured by the magnetic bodies 30 all the time corresponding to the rotation angle of the magnet, namely, the shaft.

Next, the various transformed examples of the rotation angle detection device according to the embodiment described above are explained based on the figures. Since various transformed examples described below have differences from the embodiment described above only in the shape of the magnetic bodies and the other components have similarity to the embodiment described above, detailed explanations of the similar components to the embodiment described above are omitted and shown by the corresponding codes. And, since the configurations of two magnetic bodies which are arranged in the circle direction of the magnet are equivalent, these components are denoted by the common codes for explanation similarly to the embodiment described above.

Figure 4:
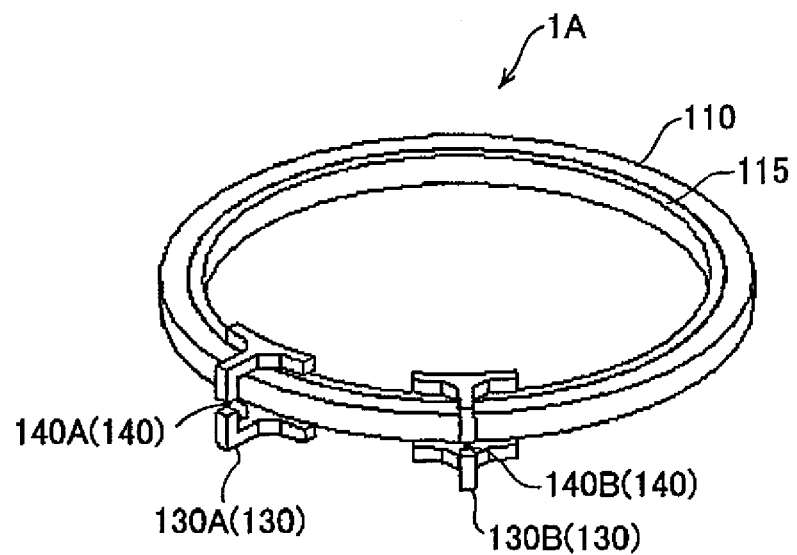
FIG. 4 is perspective view of the first transformed example of the rotation angle detection device shown in FIG. 1 corresponding to the FIG. 1.
Figure 5:
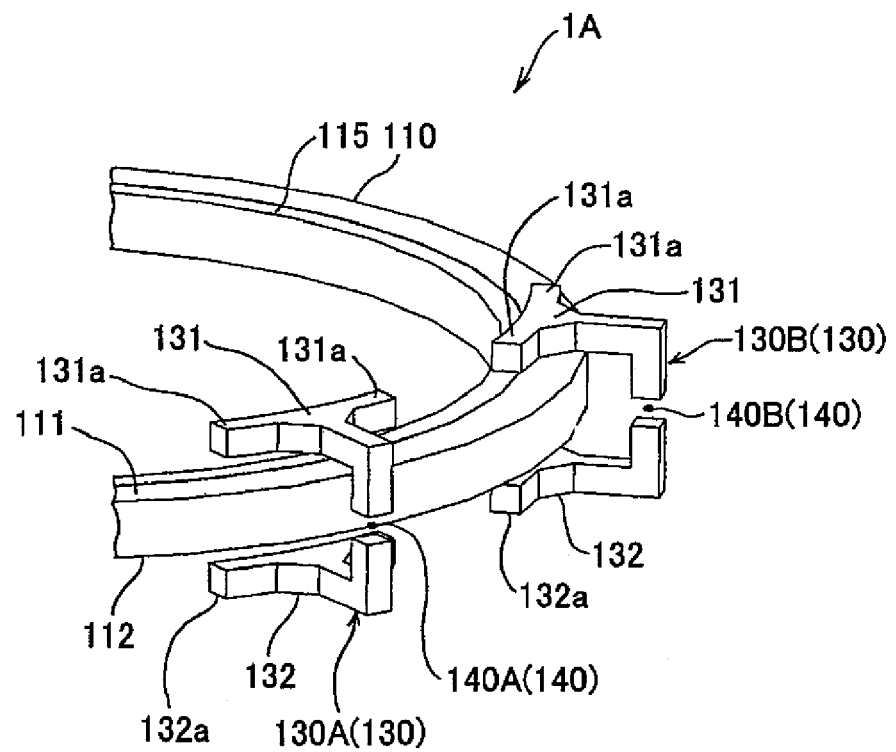
FIG. 5 is perspective view of the rotation angle detection device shown in FIG. 4 which is partially enlarged.

At first, the first transformed example of the rotation angle detection device according to the embodiment of the present invention described above. As shown in FIG. 4 and FIG. 5, in the rotation angle detection device 1A according to the first transformed example, in addition to the shape of the magnetic bodies 130 described above, the magnetic bodies 130 (130A and 130B) have the shape in which the protruding portions 131a extending toward the circle direction of the magnet 110 on one edge portions 131 of the magnetic bodies opposing to the one side 111 of the magnet 110 and the protruding portions 132a extending along the circle direction of the magnet 112 on another edge portions 132 of the magnetic bodies 130 opposing to another side 112 of the magnet 110 in the direction of the rotation center axis.

Since the rotation angle detection device 1A according to the first transformed example has this kind of configuration, even when the relative positions of the rotor having the magnet 110 and the stator having the magnetic bodies 130 and hall elements 140 (140A and 140B) are shifted in the direction orthogonal to the rotation center axis of the magnet 110, the magnetic line of force of the magnet 110 is stably formed along the magnetic bodies 130 all the time by the protruding portions 131a and 132a provided on the both edges of the magnetic bodies 130, and even when the rotor and the stator are shifted by the instability between the rotor and the stator in the direction of the rotation center axis of the rotor and in the direction orthogonal to the direction of the rotation center axis, the magnetic resistance of the magnetic path is not varied by the shifting amount of the rotor and the stator. As a result, the instability between the rotor having the magnet 110 and the stator having the hall elements 140 of the rotation angle detection device 1A is allowed to be caused in some degree, the hall elements 140 are not affected by the instability caused by the shifting of the relative positions of the rotor and the stator, the thickness and direction of the magnetic flux of the magnet 110 can be accurately detected corresponding to the rotation angle of the magnet 110, namely, the shaft all the time, and the rotation angle of the shaft can be accurately detected all the time.

Figure 6:
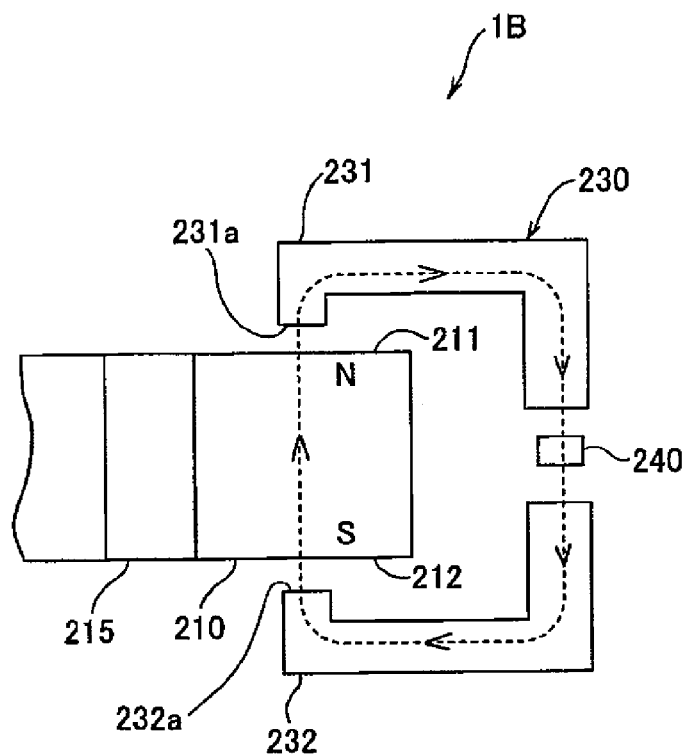
FIG. 6 is cross sectional view of the second transformed example of the rotation angle detection device shown in FIG. 1 corresponding to FIG. 2.

Next, the second transformed example of the rotation angle detection device according to the embodiment of the present invention described above is explained. As shown in FIG. 6, in the rotation angle detection device 1B according to the second transformed example, the magnetic bodies 230 have rectangular C shape and both edge portions of the magnetic bodies 230 into which the magnet 210 is inserted from one side and another side of the magnet 210 with prescribed gaps in the direction of the rotation center axis respectively.

In the magnetic bodies 230, protruding portion 231a protruding toward one side 211 of the magnet 210 is provided on one edge portion 231 opposing to one side 211 of the magnet 210 in the direction of the rotation center axis and the protruding portion 232a protruding toward another side 212 of the magnet 210 on another edge portion 232 opposing to another side 212 of the magnet 210 in the direction of the rotation center axis.

Since the magnetic body 230 of the rotation angle detection device 1B according to the second transformed example has this kind of configuration, the magnetic body, itself, has similar shape to the magnetic line of force of the magnet 210, the magnetic flux of the magnet 210 is stably formed in the magnetic body 230, and even when the rotor and the stator are shifted in the direction of the rotation center axis of the rotor by the instability between the rotor and the stator, the magnetic resistance of the magnetic path is not varied by the shifting amount of the rotor and the stator. As a result, even when the instability between the rotor having the magnet 210 and the stator having the hall element 240 of the rotation angle detection device 1B is allowed to be caused in some degree to improve assembling task of the rotation angle detection device 1B to the shaft, the hall element 240 is not affected by the shifting of the relative positions of the rotor and the stator, and the thickness and the direction of the magnetic flux of the magnet 210 can be more accurately detected by the magnetic body 230 corresponding to the rotation angle of the magnet 210, namely, the shaft.

Figure 7:
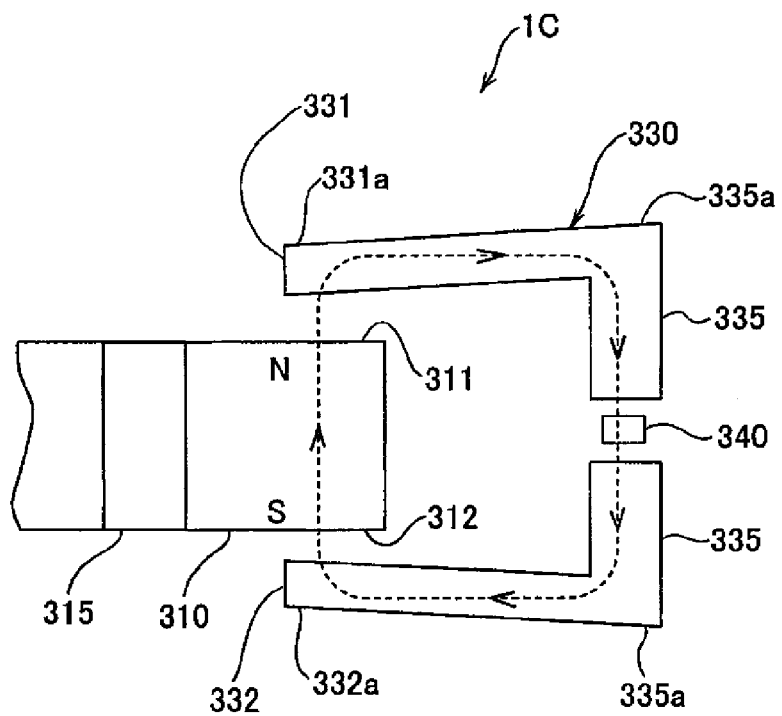
FIG. 7 is cross sectional view of the third transformed example of the rotation angle detection device shown in FIG. 1 corresponding to FIG. 2.

Next, the third transformed example of the rotation angle detection device according to the embodiment of the present invention described above is explained. As shown in FIG. 7, in the rotation angle detection device 1C according to the third transformed example, the magnetic body 330 has variant rectangular U shape in the horizontal direction and both edge portions of the magnetic body 330 into which the magnet 310 is inserted from one side and another side of the magnet 210 in the direction of the rotation center axis respectively with prescribed gaps.

And the gaps between one edge portion 331 of the magnetic body 330 opposing to one side 311 of the magnet 310 in the direction of the rotation center axis and another edge portion 332 of the magnetic body 330 opposing to the another side 312 of the magnet 310 in the direction of the rotation center axis (the distance between the edge face 331a of one edge portion 331 and the edge face 332a of another edge portion 332) is shorter than the length of the axis direction portion 335 of the magnet 310 which is parallel to the direction of the rotation center axis (the length between one edge portion 335a and another edge portion 335b of the axis direction portion 335 in FIG. 7).

Since the magnetic body 330 of the rotation angle detection device 1B according to the third transformed example has this kind of configuration, the magnetic body, themselves, have similar shape to the magnetic line of force of the magnet 310, and even when the rotor and the stator are shifted in the direction of the rotation center axis of the rotor by the instability between the rotor and the stator, the magnetic flux of the magnet 310 can be stably formed in the magnetic body 330 regardless of the shifting amount of the rotor and the stator. As a result, even when the instability between the rotor having the magnet 310 and the stator having the hall element 340 of the rotation angle detection device 1C is allowed to be caused in some degree to improve assembling task of the rotation angle detection device 1C to the shaft, the magnetic flux of the magnet 310 is stably formed in the magnetic body 330 regardless of this kind of instability, the magnetic resistance of the magnetic path is not varied. As a result, the hall element 340 is not affected by the shifting of the relative positions of the rotor and the stator, and the thickness and the direction of the magnetic flux of the magnet 310 can be more accurately detected by the magnetic body 330 corresponding to the rotation angle of the magnet 310, namely, the shaft.

Although, in the rotation angle detection device according to the embodiments and various transformed examples explained above, the usage of MR elements can be considered instead of the hall elements described above as magnetic detection elements, the thickness of the magnetic flux can be detected by the MR elements, but the polarity cannot be detected, therefore, the hall elements which can distinguish thickness of magnetic flux and polarity is more useful since the range of angle which can be detected by one element can be wider (logically twice). Accordingly, it has technical significance that the hall elements are used in the rotation angle detection device in the embodiments and various transformed examples described above.

EXAMPLES

Figure 13:
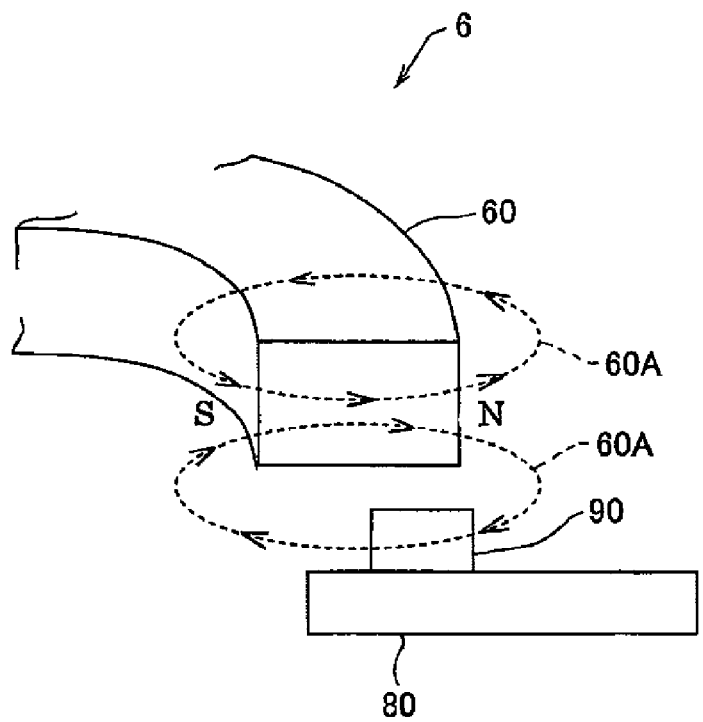
FIG. 13 is schematic cross sectional partial view of the conventional rotation angle detection device different from FIG. 11.
Figure 14:
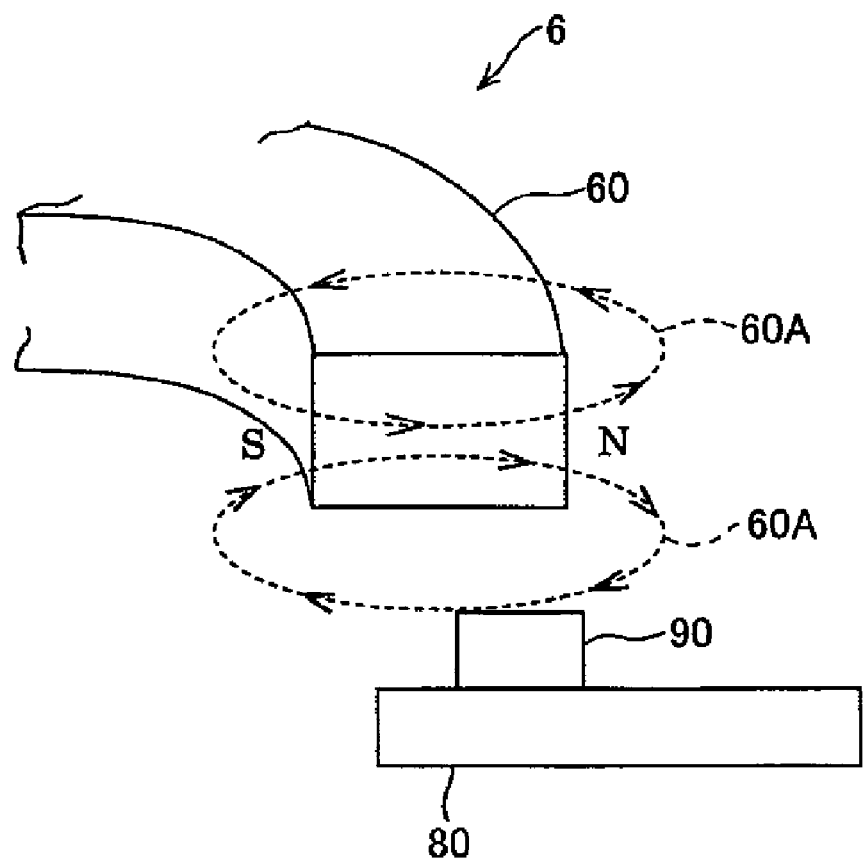
FIG. 14 is cross sectional partial view showing the status that the substrate on which the hall element of the rotation angle detection device is mounted is shifted in relation to the magnet in some degree differently from FIG. 13.

The evaluation tests comparing between the detection properties of the rotation angle detection device according to the present invention (it is described as present example below) and the conventional rotation angle detection device (it is described as comparative example below) corresponding to the shifting of the relative positions of the rotor and the stator are made, and the results of the tests are explained. In these examples, the rotation angle detection device having the ring shaped magnet shown in FIGS. 13 and 14 is used in the comparative example, and the rotation angle detection device according to the first transformed example of the present embodiment shown in FIGS. 4 and 5 is used in the present example.

Figure 8:
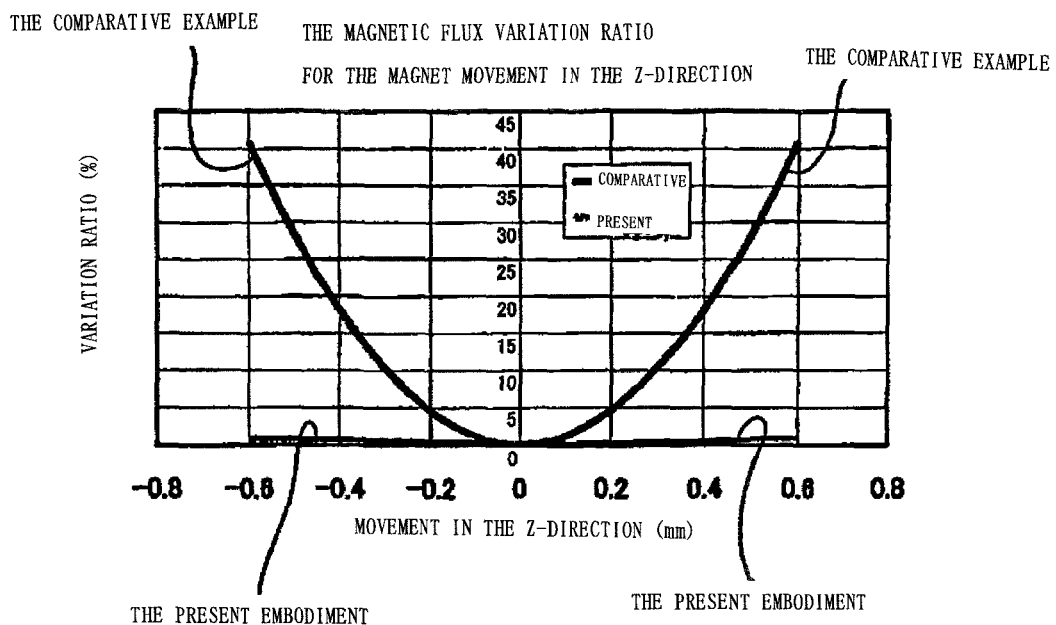
FIG. 8 is property diagram in which the rotation angle detection device according to the present invention (present embodiment) and the conventional rotation angle detection device (comparative example) are compared.

In FIG. 8, horizontal axis shows the relative moving amount (shifting amount) in the Z direction (in the direction of the rotation center axis of the magnet), and vertical direction shows variation ratio of the detection output of the hall element caused by the shifting amount in the Z direction to the detection output of the hall element in the status that the magnet and hall element have preferable relative sizes. As obvious in the property diagram, although, in the comparative example, as the moving amount of the magnet and the hall element in the Z direction become greater, the output of the hall element is considerably varied from the one in the preferable arranging status of the magnet and the hall element, in the present embodiment, even when the shifting amount of the magnet and the hall element in the Z direction become greater, the output of the hall element is hardly varied.

Figure 9:
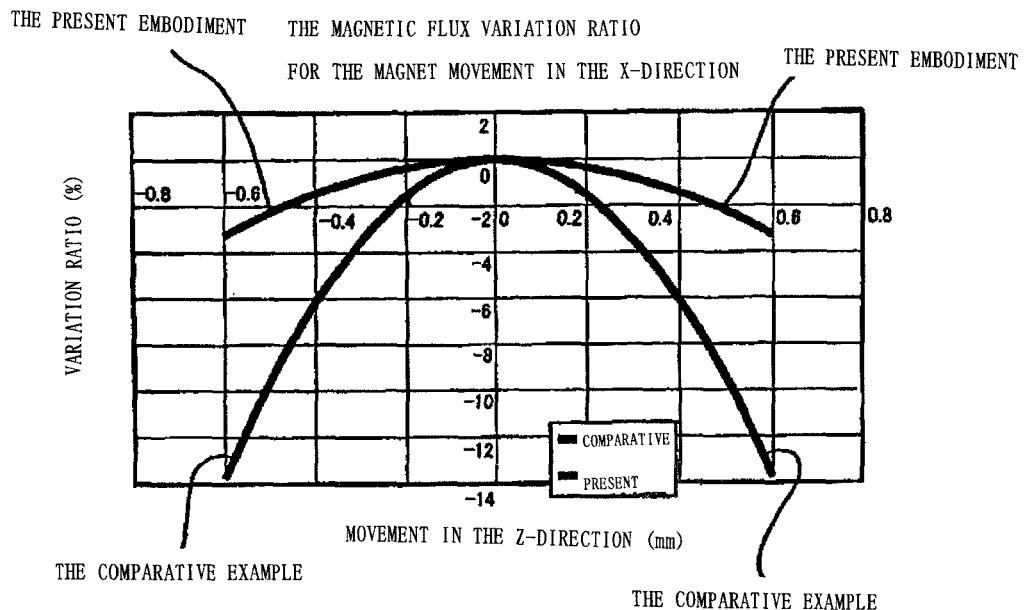
FIG. 9 is property diagram in which the rotation angle detection device according to the present invention (present embodiment) and the conventional rotation angle detection device (comparative example) are compared by means different from FIG. 8.
Figure 10:
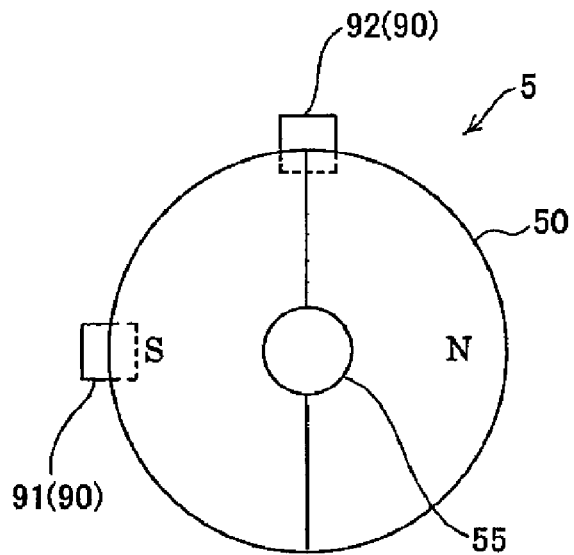
FIG. 10 is schematic plan view of the conventional rotation angle detection device.
Figure 11:
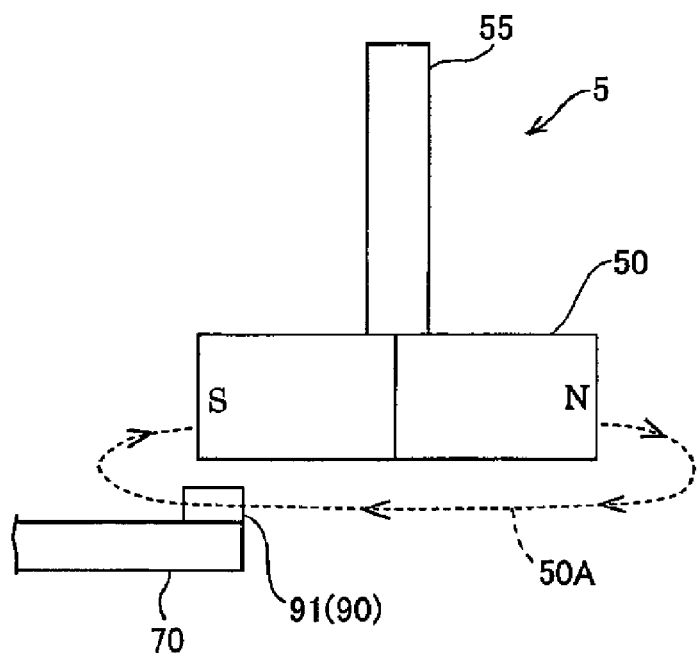
FIG. 11 is schematic side view of the conventional rotation angle detection device.
Figure 12:
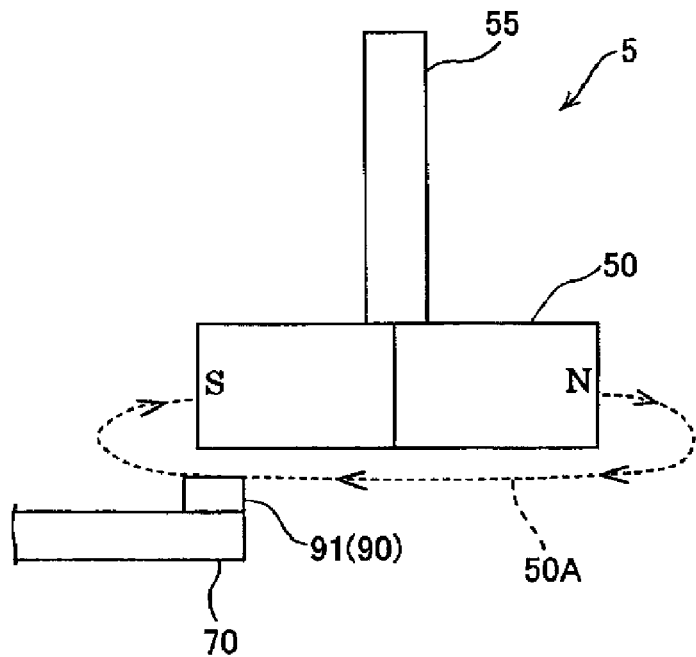
FIG. 12 is schematic side view showing the status that the substrate on which the hall element of the rotation angle detection device is mounted is shifted in relation to the magnet in some degree differently from FIG. 11.

In FIG. 9, horizontal axis shows the relative moving amount (shifting amount) in the X direction (in the orthogonal direction to the direction of the rotation center axis of the magnet), vertical direction shows variation ratio of the detection output of the hall element caused by the shifting amount in the X direction from the detection output of the hall element in the status that the magnet and hall element have preferable relative sizes. As obvious in the property diagram, although, in the comparative example, when the moving amount of the magnet and the hall element in the X direction is great, the output of the hall element is considerably varied from the one in the preferable arrangement status of the magnet and the hall element, in the present embodiment, even when the shifting amount of the magnet and the hall element in the X direction is great, the output of the hall element is hardly varied.

The rotation angle detection device according to the present invention is especially suitable for rotation angle detection of steering device for a vehicle which requires high accuracy of rotation angle detection and needs to allow variation of parts or instability of assembling status in some degree to improve assembling task. However, the rotation angle detection device according to the present invention is applicable to any device which the relative rotation angle or rotation torque of the rotation axes which rotates with vibration is required, for example, robot arm or the like.

What is claimed is:

1. A rotation angle detection device for detecting a rotation angle of a rotating body to be measured that rotates with respect to a stator, comprising: magnetic detection elements which are fixed to the stator and detect magnetic flux density of a magnet which is rotated with said rotating body to be measured, said magnet having a ring shape, the North Pole and South Pole of said magnet being formed in the direction parallel to the rotation axis of said magnet, and the North Pole and South Pole being formed so that the flux density is periodically varied also along the rotating direction of said magnet; and magnetic bodies having two edge portions in positions where said magnet is inserted and arranged along an area where a magnetic line of force of said magnet is formed, wherein there are gaps between one edge portion of said magnetic bodies and one side of said magnet in the direction of the rotation center axis of said magnet, and between another edge portion of said magnetic bodies and another side of said magnet in the direction of the rotation center axis of said magnet, said magnetic detection elements are intermediated in the magnetic line of force which passes through said magnetic bodies, and the magnetic flux density detected by the magnetic detection elements is sinusoidal with respect to the rotation angle of the magnet, and the forming areas of the North Pole, one side of the magnet, and South Pole, opposite edge portion to one edge portion in a diameter direction, are gradually exchanged between the one edge portion and the another edge portion of the magnet in the rotation center axis in a thickness direction of the magnet, said magnetic detection elements comprising a pair of hall elements arranged with the arranging positions where output properties detected by the elements are shifted in phase by an angle of 90 degrees, the output property by the respective hall elements is a sinusoidal wave having a rotation angle in 360 degree cycle, the rotation angle is detected based on $\tan^{-1}(X/Y)$, where X and Y are respective outputs of the hall elements, and a part where the magnet is inserted between said magnetic bodies is only a fraction part of the magnet.

2. A rotation angle detection device claimed in claim 1, wherein
protruding portions extending along the rotating direction of said magnet are respectively provided on one edge portions of magnetic bodies opposing to one side of said magnet in the direction of rotation center axis and on another edge portions of magnetic bodies opposing to another side of said magnet in the direction of rotation center axis.

3. A rotation angle detection device claimed in claim 1, wherein
protruding portions protruding toward one side of said magnet are provided on one edge portions of magnetic bodies opposing to one side of said magnet in the direction of rotation center axis and protruding portions protruding toward another side of said magnet are provided on another edge portions of magnetic bodies opposing to another side of said magnet in the direction of rotation center axis.

4. A rotation angle detection device claimed in claim 1, wherein
gaps between one edge portions of said magnetic bodies opposing to one side of said magnet in the direction of rotation center axis and another edge portions of said magnetic bodies opposing to another side of said magnet in the direction of rotation center axis are shorter than the length of the portions of said magnetic bodies substantially parallel to the direction of rotation center axis of said magnet.

5. The rotation angle detection device claimed in claim 1, further comprising:
calculation process means for calculating the rotation angle of said rotating body to be measured from outputs of said magnetic detection elements.

* * * * *